UNITED STATES PATENT OFFICE.

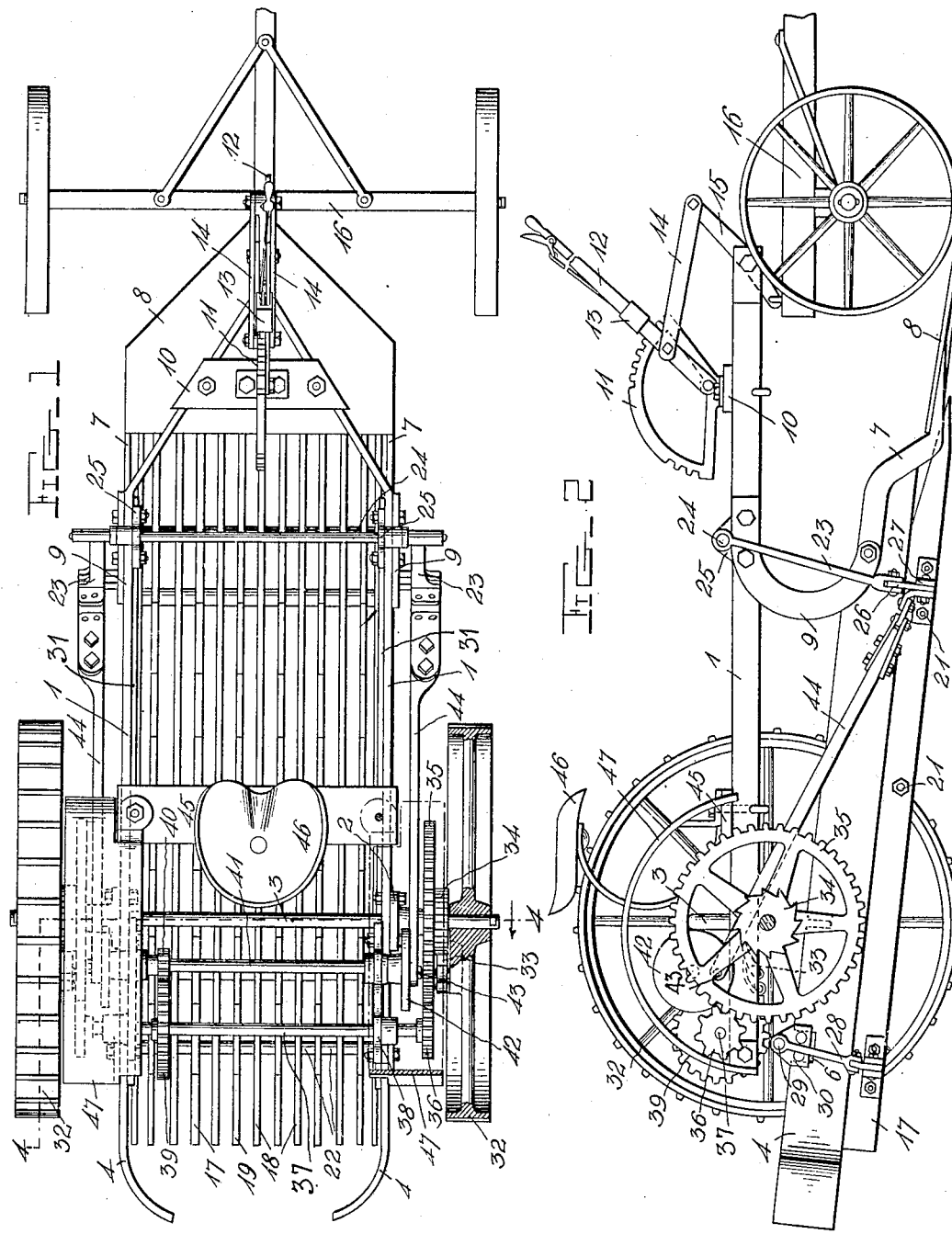

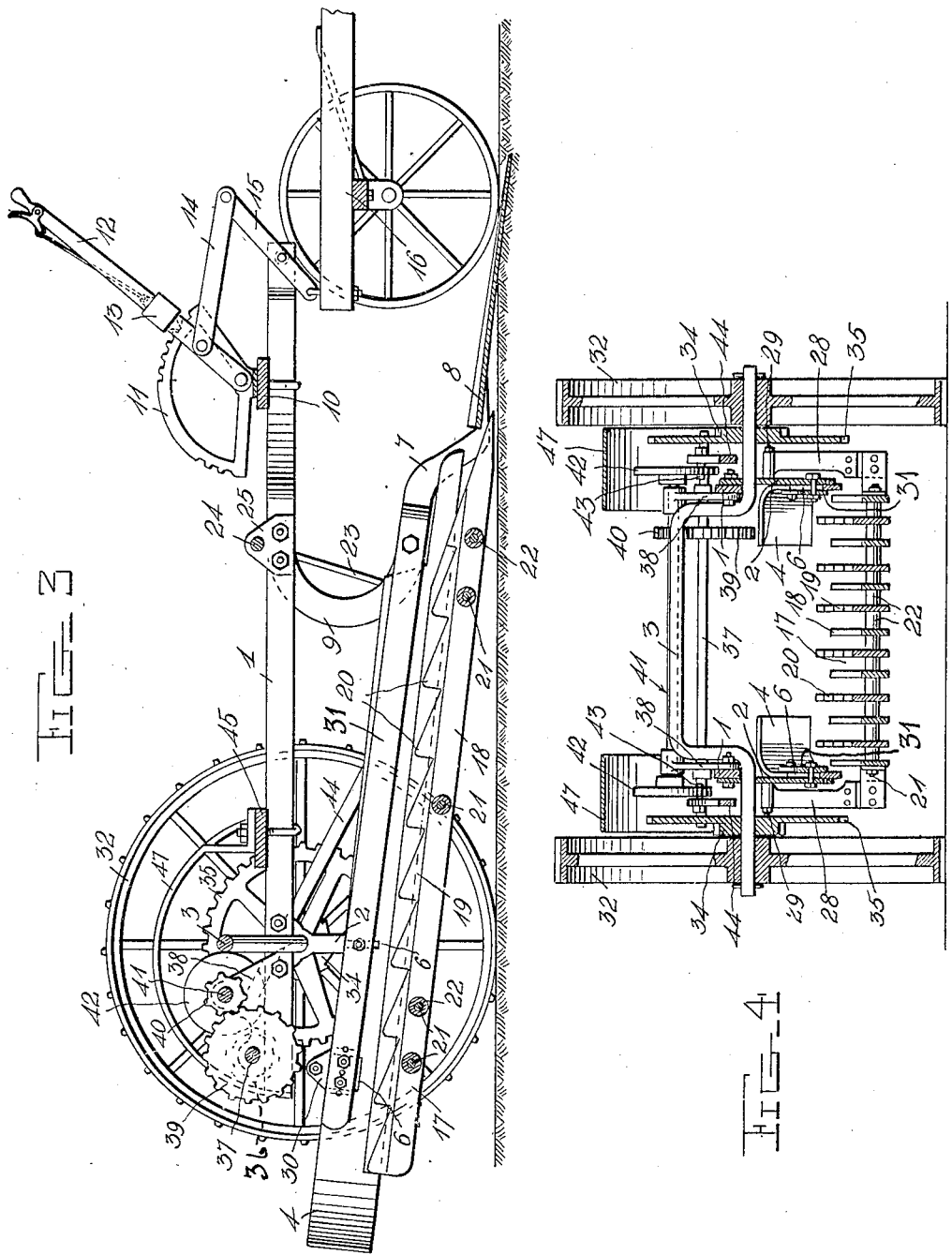

JULIUS MOLD, OF SUNRISE, MINNESOTA.

POTATO-DIGGER.

No. 876,075.  Specification of Letters Patent.  Patented Jan. 7, 1908.

Application filed April 8, 1907. Serial No. 367,010.

*To all whom it may concern:*

Be it known that I, JULIUS MOLD, a citizen of the United States, residing at Sunrise, in the county of Chisago and State of Minnesota, have invented certain new and useful Improvements in Potato-Diggers; and I do declare the following to be a full, clear, and exact description of the invention, such as will enable others skilled in the art to which it appertains to make and use the same.

My invention has relation to certain new and useful improvements in potato diggers of that class in which the potatoes are raised from the ground by a shovel or scoop and deposited upon a vibrating or shaking screen, while the dirt is loosened and falls to the ground, and the potatoes travel to the rear of the machine and are deposited on the loosened earth.

The main objects of the invention are to provide an improved form of vibrating screen that may be readily and easily separated into its component parts.

A further object of the invention is to provide a simple form of adjusting means for adjusting the position of the rear end of said vibrating screen with respect to a horizontal plane.

With these and other objects in view, that will readily appear as the nature of the invention is better understood, my invention consists in certain novel features of construction and combination of parts, illustrated in the drawings and particularly pointed out in the specification and claims hereunto appended, it being understood that various changes in the form, proportion and minor details of construction may be resorted to without departing from the spirit or sacrificing any of the principles of the invention.

In the accompanying drawings,—Figure 1 is a top plan view of a potato digger constructed in accordance with my invention; Fig. 2 is a side elevation, one of the supporting wheels removed to more advantageously show the construction of certain parts; Fig. 3 is a longitudinal sectional view; Fig. 4 is a transverse sectional view on the line 4—4 of Fig. 1, looking in the direction of the arrows.

Similar numerals of reference are employed to indicate corresponding parts throughout the several views of the drawings.

The frame of the machine comprises two side bars or castings 1, which converge at the front of the machine and are bolted or otherwise secured near their rear ends to the upper ends of supporting uprights 2, which are secured near the ends of the main axle 3, which is of preferably bowed form. Said supporting uprights 2, are bolted or otherwise secured at their lower ends to the outer sides of longitudinal guard bars 4, provided in their upper edges a suitable distance rearward of said main axle with recesses 6, the purpose of which will be shown.

The numeral 7 represents two shovel supporting bars which are secured near their rear ends to the outer sides and near the lower ends of the longitudinal guard bars 4, and have secured to their front ends a shovel or scoop 8, adapted to enter the ground and raise the potatoes above the surface. The front ends of said longitudinal guard bars 4 are held in position by two depending, and preferably curved supporting bars 9 secured at their upper ends to the outer sides of said side bars or castings 1, and at their lower ends to said supporter bars 7. A cross bar 10 is secured to the upper edges and near the front ends of said side bars 1, and serves as a support for a toothed locking segment 11, which is fastened to the upper face thereof, and has pivoted to one side a lever 12 having a spring pawl 13, adapted to engage in the notches of said locking segment. Said locking lever is also provided with two corresponding oppositely disposed bars 14, which are connected to it at their inner ends, and adjustably and removably connected at their front ends to the upper end of a raising bar 15, pivoted between and near the front ends of said side bars 1, and provided at its lower end with means for engaging a clip or other suitable means secured to the rear end of a wheeled truck 16, said lever 12 being adapted to regulate the depth at which the shovel or scoop 8 enters the ground.

The numeral 17 represents the vibrating frame of the machine, which works rearward of said shovel or scoop 8, and comprises a number of flat longitudinal bars 18 and a number of longitudinal cutting blades 19, each having a number of notches in its upper edge to provide a plurality of cutting edges 20. Said screen bars are arranged alternately on transverse rods 21 and are spaced a predetermined distance apart by spacing blocks or spools 22, loosely secured around said rods 21 between said bars. Said rods are provided at one of their ends with threads, on which are disposed nuts for holding the said screen bars 18 and 19, and so that the vibrating screen may be readily and easily separated into its component parts. The front ends of said screen bars are held in operative position by links 23, which are connected at their upper ends near the outer ends of a transverse rod 24, journaled in suitable castings or bearings 25, fastened to the inner sides of said bars 1, rearward of said locking segment 11, and at their lower ends by leather strips 26 or other suitable flexible material, between the inner sides of angular plates 27 secured removably to the ends of the two foremost of said rods 21. The rear ends of said screen bars are held in operative position by links 28, hinged at their upper ends to the bodies of bolts 29, secured transversely, and at their threaded ends by nuts to bearings or castings 30, of suitable form. Longitudinal clamping bars 31 are secured to the inner faces of said longitudinal guard bars 4 and are secured at their rear ends to the lower ends of said bearings 30 by bolts and nuts, or other equivalent means. The rear ends of said longitudinal clamping bars 31 extend a slight distance beyond the rearmost vertical walls of the said recesses in said longitudinal guard bars, and the inner faces of said bearings 30 are secured to the rear ends of said longitudinal bars immediately opposite the recesses in said guard bars, and their outer edges extend somewhat beyond the vertical walls of said recesses. The bars 4 and 31 are secured to the uprights 2 by clamping the latter between said bars.

The numeral 32 represents the supporting wheels of the machine, which are journaled to the ends of said main axle 3 and are provided with pawls or dogs 33, which are held in engagement by means of springs secured to said wheels with ratchet wheels 34, secured in any suitable manner to the outer faces of gear wheels 35, loosely connected near the ends of said main axle inward of said supporting wheels and adapted to intermesh with pinions 36 fixed to the ends of a transverse axle 37, journaled in suitable castings or bearings 38, bolted or otherwise secured to the inner faces and near the rear ends of said side bars 1. Said transverse axle 37 is also provided near one end inward of the adjacent casting or bearing 38, with a gear wheel 39 adapted to mesh with a pinion 40, rigidly connected to a transverse axle 41, journaled in said castings or bearings 38, forward of said axle 37 and provided on its extreme ends outward of said castings with disks 42, having wrist pins 43 on their outer faces and connected with the lower ends of said links 23 by pitmen 44. 45 represents a cross bar, which is secured by clips or other equivalent means to the upper edges of said side bars 1 forward of said main axle 3, and serves to support a seat 46, and as a means for attaching the inner ends of guards 47, extending rearwardly from said cross bar 45 and protecting certain parts of the mechanism used for operating the vibrating screen.

In the operation of the machine the cutting edges 20 of said longitudinal cutting blades 19 cut and loosen the dirt from around the potatoes, and said longitudinal bars 18, whose upper edges are preferably below the cutting edges of said blades 19, prevent the potatoes from falling through the vibrating screen. This construction of screen greatly facilitates removing the dirt from the potatoes, and causing the same to be carried to the rear part of the machine.

The recesses 6 in the upper edges and near the rear ends of said longitudinal guard bars permit said castings or bearings 30 and the rear ends of said longitudinal bars 31 to be raised or lowered as desired, and raise or lower the rear end of the vibrating screen. Said pawls 33 and ratchet wheels 34 cause the vibrating screen 20 to operate when the machine is moving forwardly, but permit of the machine being turned or backed, as in going from one row of potatoes to another, without operating said screen.

Having described my invention, I claim:—

1. In a device of the character described, a supporting frame, a relatively stationary shovel arranged near the front end of said frame, a vibratory screen comprising a number of straight longitudinal bars and a number of longitudinal cutting blades, the latter having a plurality of cutting edges, the upper edges of said bars and blades arranged alternately a predetermined distance apart and extending lengthwise of said supporting frame, longitudinal guard bars having recesses in their upper edges supported by said frame, longitudinal bars secured to the faces of said guard bars, their rear ends extending beyond the rearmost vertical walls of said recesses, bearings secured to the rear ends of said longitudinal bars, and adapted to clamp the outer sides of said guard bars, and means hinged to said bearings for operatively supporting the rear end of said vibratory screen.

2. In a device of the character described, a supporting frame, a relatively stationary shovel, shovel supporting means, a vibratory screen comprising a number of straight longitudinal bars, and longitudinal cutting blades having cutting edges at their upper edges arranged lengthwise of the frame, longitudinal guard bars having recesses in their upper edges near the rear ends, supported by said frame, longitudinal bars adjustably pivoted at their front ends to the inner faces of said guard bars, their rear ends extending beyond the recesses in said guard bars opposite said recesses in said guard bars, and adapted to clamp said guard bars, with means hinged to said bearings for operatively supporting the rear end of said vibratory screen.

In testimony whereof I have hereunto set my hand in presence of two subscribing witnesses.

JULIUS MOLD.

Witnesses:
 HENRY VOSS,
 THEODORE M. VOSS.